United States Patent [19]

Torng

[11] 4,383,315
[45] May 10, 1983

[54] IDLE TIME SLOT SEIZURE AND TRANSMISSION FACILITIES FOR LOOP COMMUNICATION SYSTEM

[75] Inventor: Hwa C. Torng, Ithaca, N.Y.

[73] Assignee: Bell Telephone Laboratories, Incorporated, Murray Hill, N.J.

[21] Appl. No.: 284,738

[22] Filed: Jul. 20, 1981

[51] Int. Cl.³ ............................. H04J 6/00; H04J 3/08
[52] U.S. Cl. ......................................... 370/89; 370/93; 340/825.05
[58] Field of Search .................... 370/89, 86, 93, 95, 370/85, 92; 340/825.05, 825.5, 825.51

[56] References Cited

U.S. PATENT DOCUMENTS

| | | | |
|---|---|---|---|
| 3,597,549 | 8/1971 | Farmer et al. | 179/15 |
| 3,647,975 | 3/1972 | Goto et al. | 370/93 |
| 3,731,002 | 5/1973 | Pierce | 179/15 |
| 4,063,220 | 12/1977 | Metcalfe et al. | 370/93 |
| 4,251,880 | 2/1981 | Baugh et al. | 370/80 |

OTHER PUBLICATIONS

Computer Design, vol. 19, No. 9, Sep. 1980, "A Distributed Processing System for Military Applications", Parts 1 & 2, pp. 14-54, by Mauriello.
IEEE Conference Proceedings-2nd Annual Symposium on Computer Architecture, Jan. 20-22, 1975, pp. 7-12, by Reames et al.
Communications of the ACM, vol. 19, No. 7, Jul. 1976, "Ethernet: Distributed Packet Switching for Local Computer Networks", pp. 395-404, by Metcalfe et al.
Computer Communications, vol. 2, No. 4, Aug. 1979, "Survey of Computer Communications Loop Networks", pp. 165-241, by Penney et al.
"Carrying Voice Traffic Through an Ethernet Local Network—A General Overview", by Shoch, Jun. 1980, Xerox, Palo Alto Research Center.
Computer Networks, vol. 4, 1980, "Multimode Communications on the MITRENET," pp. 229-233.
ACM Symposium on Problems in the Optimization of Data Communications Systems, Oct. 13-16, 1969, pp. 1-33.
Bell System Technical Journal, vol. 51, No. 6, Jul.-Aug. 1972, "Network for Block Switching of Data", pp. 1133-1145.

Primary Examiner—Douglas W. Olms
Attorney, Agent, or Firm—F. W. Padden

[57] ABSTRACT

A time division multiplex loop communication system for voice and data is disclosed with multiaccess time slot seizure and data transmission capability from all station nodes without changing the idle, nonreserved, status of the seized time slot. A method and station node apparatus sends bursty data packets from a node when a time slot is not busy serving a longer duration voice telephone call. The apparatus eliminates the need for inefficient time slot request, acknowledgement and reservation procedures which require several TDM frames to complete and which are typically longer in duration than the bursty data packet to be transmitted. All stations have access to all time slots for bursty data transmission under control of loop interface circuitry which statistically ensures the successful data transmission from all sending nodes. The interface circuitry includes input and output buffers, slot and bit identification circuitry, bit stream retard circuitry, output selector circuitry, bypass decision circuitry, and data and voice insertion control circuitry comprising a slot decision control circuit, a seizure timing circuit and an acknowledgment check circuit.

30 Claims, 11 Drawing Figures

FIG. 3

| CR | DC | COMMAND OR SAMPLES |
|----|----|--------------------|
| 1  | 2  |                    |

CR = { 1 CHANNEL RESERVED
       0 CHANNEL FREE

DC = { 0 DATA OR VOICE SAMPLES
       1 COMMAND

FIG. 4

| CR | 0 | DATA OR VOICE SAMPLES |
|----|---|------------------------|
| 1  | 2 |                        |

FIG. 5

| CR | 1 | DESTINATION ADDRESS | SOURCE ADDRESS | COMMAND CODE |
|----|---|---------------------|----------------|--------------|
| 1  | 2 |                     |                |            n |

IDLE TIME SLOT SEIZURE AND TRANSMISSION FACILITIES FOR LOOP COMMUNICATION SYSTEM

TECHNICAL FIELD

This invention relates to a method and equipment for controlling a seizure of an idle time slot in a time division loop, or ring, communication system and for transmitting information in that time slot while it retains its idle, or nonreserved, status.

BACKGROUND OF THE INVENTION

Loop transmission facilities differ from communications bus transmission facilities in that the data stream in a loop network is sequentially receivable at each port disposed around the loop network whereas in a communications bus facility, the data is concurrently broadcast to all ports and the transit time is assumed to be negligible.

A number of loop transmission systems have been proposed including the well-known Pierce loop described in U.S. Pat. No. 3,731,002 and the Farmer-Newhall loop described in U.S. Pat. No. 3,597,549.

The loop networks have primarily been considered appropriate for the transmission of information in the form of digitally encoded data signals. The use of the loop network architecture for telephonic voice communication, however, has been hindered by the fundamentally different criteria applicable to different data and voice disciplines. Mainly, telephonic voice communication usually involves a dedication of a channel, or time slot, to a particular call with relatively long holding time compared to the time slot set-up requesting, addressing, acknowledgment, and reservation times. Certain kinds of data transmission on the other hand are characterized by being "bursty" and of short duration compared to the time slot set-up time. Moreover, certain kinds of data can tolerate a certain margin of delay in transmission and, if transmission is not successful, can withstand the need for a certain number of retransmission attempts.

A prior art system is described in the October/November 1980 issue of *Computer Networks* in an article by G. T. Hopkin entitled "Multimode Communications on the MITRENET"; that article describes voice and data communications in a bus system. A specific number of time slots in that communication bus are reserved for voice communications; the balance are reserved exclusively for data services. In the Mitrenet System, two channels, or time slots, must be reserved for voice communication between each pair of ports, one channel for voice transmission from a port A to a port B and a second channel for voice transmission from port B to port A. It is not possible to achieve concurrent data transmissions in one time slot among stations. The Mitrenet System having definite time slots for voice transmission may at any time be exposed to the need to meet data traffic while all of the available channels are in use. Likewise, such a system may be exposed to the need to provide actual channels to meet voice traffic when the remaining channels are not actually in use for data traffic. In neither of these situations, however, is there a definite channel assignment system available to seize additional channel capacity to handle the offered traffic.

A problem in such prior art is that complicated and inefficient procedures are required for requesting and reserving available time slots for transmitting either voice or data. Such procedures are particularly cumbersome and time consuming for the transmission of "bursty" data packets which oftentimes are shorter in duration than the time required for requesting, seizing, acknowledging and reserving a channel for the intended data transmission.

SUMMARY OF THE INVENTION

The foregoing and other problems are solved in accordance with the principles of my invention in one illustrative embodiment in which repetitive sequences of time slots are divided in a loop switching network in such a manner that time slots reserved for use for telephonic voice communication is identified by a predetermined channel reservation bit. The ports in the loop network which repeat the time slots respect the identified bit in such a manner that the time slot bearing such a bit will always be forwarded without interruption around the loop until it is received by its destination port. The destination port may then employ that time slot in its return journey for the second part of two-way communications.

Other time slots may similarly be reserved by ports requiring channels for telephonic communications in an offered traffic basis. All of the time slots not so taken for telephonic voice traffic may be seized for use in an offered traffic basis by any of the ports having bursty data traffic. A seizure is a commandeering of an idle time slot for insertion therein of a packet of information bits without changing that time slot status. Before such a bursty data port seizes a nonreserved time slot however, a decision is made locally as to the appropriateness of seizing the particular available slot. This decision is based on the premise that a port offering bursty data traffic with an available slot will shunt aside, if any, the data information contained in that slot and substitute its own data. Therefore, where traffic is light, it is a reasonable probability that the seized slot will in fact be empty of data when the seizing port inserts its own data. As bursty data becomes heavy, the probability of having data packets shunted aside increases. To enhance the system throughput of data packets successfully transmitted, time slot seizure decision circuitry is provided to prevent seizure of an otherwise seizable slot on a statistical basis. Accordingly, even though a port may have outgoing data traffic available to be placed in an arriving nonreserved, or idle, slot, the port will not necessarily seize that slot for its own data, but will wait for a time period, statistically determined. In an idle state, a time slot may contain information bits as a result of its seizure by an upstream port. Nevertheless, the port will seize nonreserved slots and insert its data thereby achieving a certain statistical probability that the inserted data will not unduly interfere with the data traffic. It is an important aspect of my invention that the basis for the operation of the time slot seizure decision circuitry is that the total number of successfully transmitted data packets is maximized by utilizing a statistical algorithm and circuitry in each of the ports.

It is a feature of my invention that data is transmitted in an available time slot without the need for time consuming channel request, acknowledging and reservation procedures. Each of the ports is advantageously arranged to examine a channel reservation bit for a time slot and to ascertain when that slot is available for bursty data transmission. The port circuitry seizes a nonreserved time slot to transmit "bursty" data without reserving, or busying, that time slot. When a data packet approaches a given port, the time slot data is entered into an input buffer so that information in that slot can be examined and utilized. Output buffers in cooperation with logic circuitry in the port may substitute its port data into the seized slot for transmission around the loop to its destination port. The transmitted data may encounter shunting out of the loop by time slot seizure operations occurring in downstream ports. On the other hand, data packets may be successfully transmitted to a plurality of destination ports "concurrently" with one time slot.

Upon examining a time slot transmission at a destination port, that port formulates an appropriate acknowledgment signal packet and deposits it in its output buffer for transmission to the calling port in a manner identical to that for transmitting the data to the destination port. That is, a nonreserved slot seizure occurs at the destination port for sending the acknowledgment signal and advantageously without reserving the seized time slot and without invoking reservation procedures. Advantageously, my invention coalesces a circuit-switched structure with a multiaccess ring, through the introduction of channel reservation/release and slot seizure concepts.

A feature of my invention is the provision in a time division loop communication system of time slot seizure facilities for furnishing integrated voice and data services to a plurality of station ports disposed along a loop transmission arrangement. Time division multiplexing is utilized with a plurality of successively recurring time frames each of which includes a plurality of time slots that each have at least one bit for indicating the reserved/free status of that time slot and digitally encoded information bits. Each of the station ports comprises circuitry responsive to a receipt of a time slot free indicating bit of one of the time slots and to a slot request signal for controlling a seizure of that time slot to transmit information bits. Apparatus in each such station port is activated by the controlling circuitry for transmitting from that port onto the loop transmission arrangement the free indicating bit and the station information bits in a seized one of the time slots.

A salient feature is that each station port is equipped with a loop interface which has a slot decision circuit for controlling the selective seizure of a nonreserved time slot. The decision circuit responds to slot seizure requests and analyzes the contents of input and time slot buffers for generating time slot seizure signals under control of a seizure timing circuit. Advantageously, the timing circuit statistically controls slot seizures for maximizing the number of successful transmissions on the loop system and to enhance concurrent transmissions by multiple stations seizing identical time slots.

It is a feature of this invention that the seizure timing circuitry functions to define a time interval that a station port must wait before it attempts to seize an available, nonreserved, time slot. Effectively, it statistically controls the generation of a slot seizure signal until there is a reasonable probability that the data sought to be transmitted will actually be successfully transmitted to the intended destination without being shunted by an intermediate station on the loop seizing the same time slot.

A feature of my invention is that the seizure timing circuit includes a counter settable to a predetermined integer count which defines the interval that a station port must wait before it attempts to seize an available, nonreserved, time slot. The setting is controlled by an arrangement which estimates the number of other station ports ready to seize time slots illustratively for transmitting short and bursty data items. The setting is further controlled by an integer which defines a range of waiting periods before a slot seizure is effected by a ready station. The counter setting is illustratively decremented at prescribed clock times by the slot decision control circuit until the waiting period has elapsed. The control circuit then generates a seizure signal for the next free time slot for sending the bursty data items in that slot and advantageously without changing the nonreserved, free, status of that slot.

Another feature of this invention is the provision of circuitry in the slot decision circuit for checking for a receipt of a signal from the intended destination circuit that acknowledges a successful receipt of the transmitted bursty data items. The checking circuitry includes another timer that generates a time interval within which the acknowledgment signal must be received. If it is not received in that interval, the timer alters the predetermined integer count of the seizure timing circuit counter to reflect a nonreceipt of the acknowledgment signal so as to increase the expected waiting period before another slot seizure is generated by the slot decision control circuit.

DRAWING DESCRIPTION

FIG. 3 depicts the general format for a command or voice/data sample packet transmittable in one time slot;

FIG. 4 illustrates a packet with voice or data samples;

FIG. 5 is a command format;

DETAILED DESCRIPTION

Figure 1:
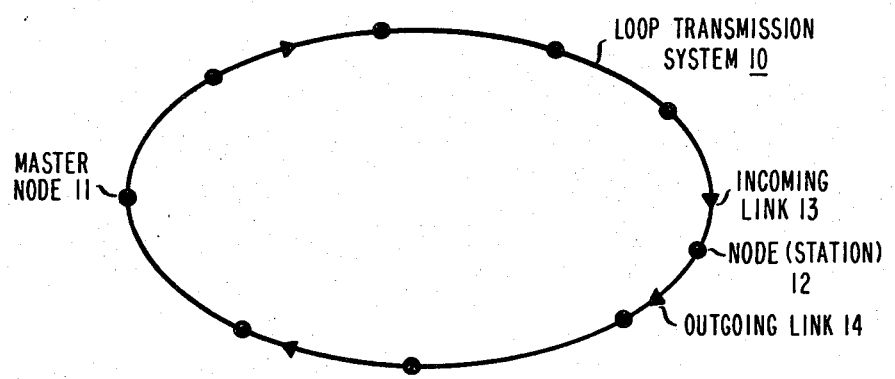
FIG. 1 is an overall schematic diagram depicting a loop communication system with a plurality of node stations, incoming and outgoing links, and a master node.

FIG. 1 shows a time division multiplex loop transmission system 10, having a master node 11 and plurality of ports, such as port 12, disposed along the loop, which can be advantageously implemented with optical fibers or coaxial cables. Signals travel on the loop system 10 in one direction and one direction only. Each node has one incoming link and one outgoing link. For example, in the case of node 12, there is an incoming link 13 and an outgoing link 14. To enhance system reliability, an implementation may incorporate two loop transmission systems 10, with information transmitted in opposite directions.

Information transmission, be it data or voice, is conveyed on the loop system 10 on a synchronous time division multiplexing basis. A fixed time interval, say 1 second, is partitioned into f frames; each frame is divided into m slots; and each slot contains n bits.

One node, node 11, is designated the master node, which supplies timing signals for the entire loop; other nodes derive their clocks from the bit stream on loop system 10. An elastic memory is provided in node 11 so that the bit stream, after suffering delays incurred in passing through the nodes and the data links around loop system 10, can be synchronized with the next frame.

Figure 2:
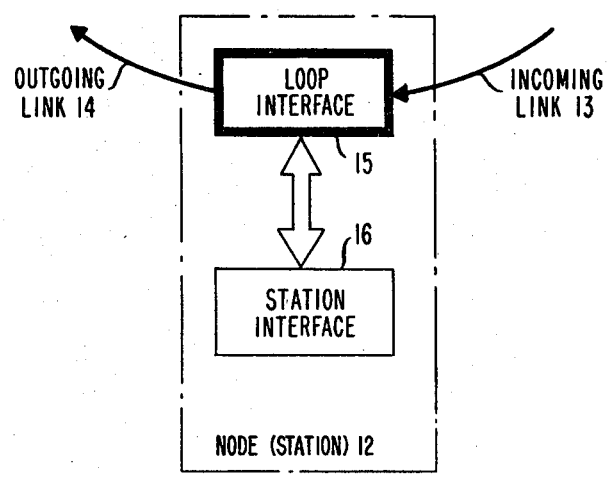
FIG. 2 shows a block diagram of a node station with loop and station interfaces.

FIG. 2 depicts the general structure of node 12, which consists of two parts: loop interface 15 and station interface 16. The latter provides, translates, and transmits control signals and information signals to and from loop interface 15 and terminal devices (not shown), telephones, data sets, and telemetering devices.

Station 12 is equipped to seize an idle slot to transmit an n-bit data packet; this is termed a slot seizure. Station 12 is also equipped to reserve a specific slot of every frame for transmission purposes; in so doing, it acquires a channel with a capacity of nf bits/second. Station 12 is arranged selectively to seize a slot to transmit bursty data items or reserve a channel to meet voice and/or data communication needs with long holding times.

Loop interface 15 implements control and information transfer between loop transmission system 10 and station interface 16. It is in loop interface 15 that channel reservation and channel release procedures are executed. Importantly, slot seizures are advantageously implemented in loop interface 15. It is therefore heavy-lined blocked in FIG. 2 for emphasis and is shown in more detail schematically in FIGS. 6, 7, and 10.

FIGS. 3, 4 and 5 depict the formats used in loop transmission system 10. Each slot carries n bits; the first two bits designated CR and DC of each slot as shown in FIG. 3 are used for specific purposes. The CR bit is a channel reservation bit and is used to indicate whether a channel is reserved or not. The DC bit is a data/command bit used to indicate whether the remaining n-2 bits constitute a command or a collection of voice or data samples.

The CR bit advantageously enables each and every slot to be either "channel reserved" for communication service with long holding times or "slot seized" for bursty data traffic. In other words, each and every slot can be dynamically assigned for various communication services.

FIG. 4 depicts the format for data and voice samples. Error detection and error correction information, if any, is suitably imbedded within the n-2 bits.

FIG. 5 depicts the format for commands including the CR and DC bits together with destination and source address bits and a command code, which implement channel reservation, channel release, acknowledgments and other system functions as hereinafter described.

Figure 6:
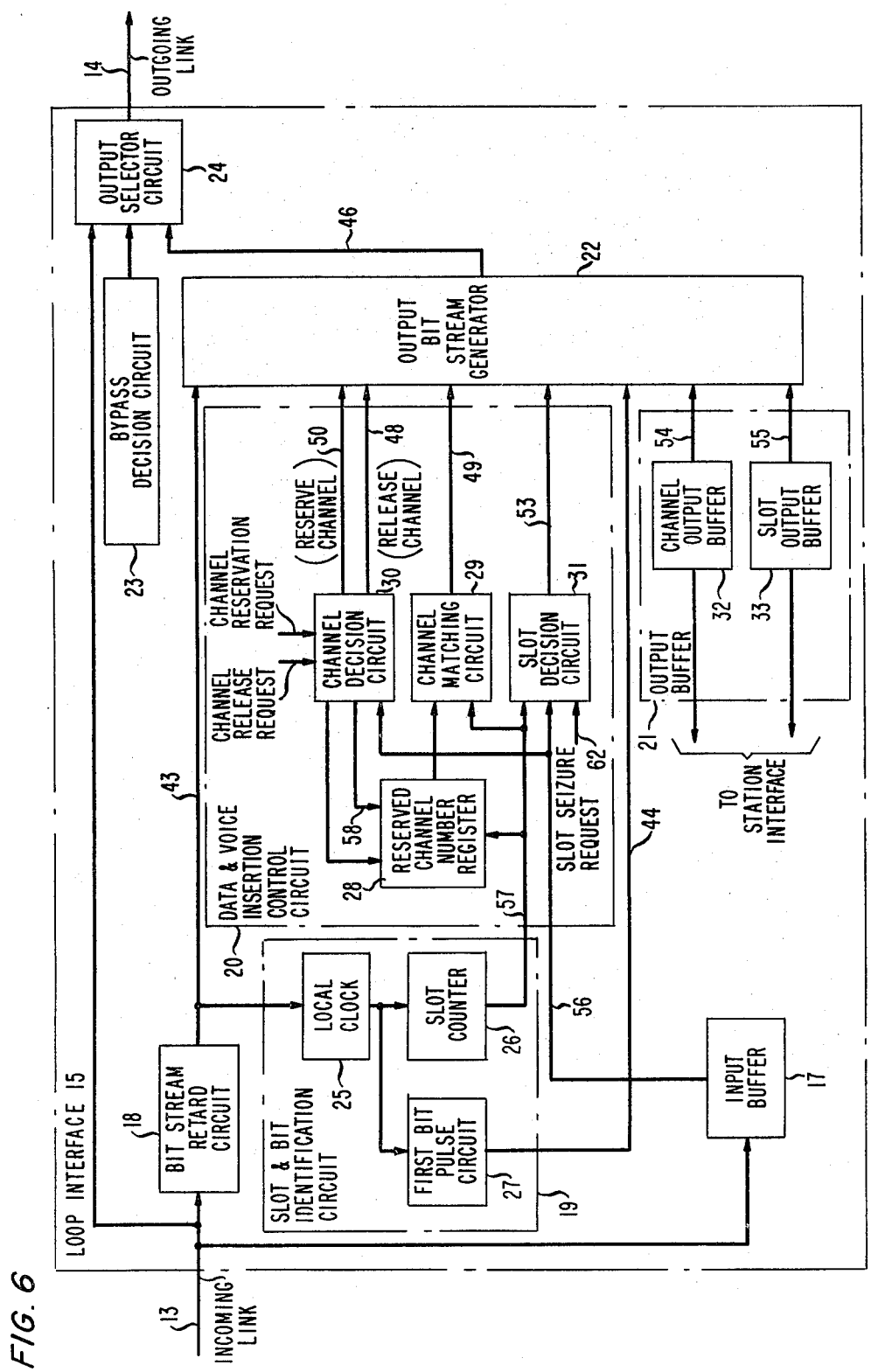
FIG. 6 shows in block diagram form an illustrative loop interface arrangement.

FIG. 6 provides a block diagram of loop interface 15 which sequentially receives over the incoming loop link 13 the bits forming each time slot command, voice and data samples including the CR and DC bits. The interface 15 illustratively comprises eight fundamental functional building blocks, namely, an input buffer 17, a bit stream retard circuit 18, a slot and bit identification circuit 19, a data and voice insertion control circuit 20, an output buffer 21, an output bit stream generator 22, a bypass decision circuit 23, and an output selector circuit 24.

Input buffer 17 is an n-bit register which sequentially accumulates the incoming bits in one time slot and stores them for decoding and distribution operations. If the n-bit packet is not a message destined for the station 12 served by interface 15, that packet will simply be written over in buffer 17 by the packet received in the next time slot.

Bit stream retard circuit 18 is used in the input data path from link 13 to introduce illustratively a 1-bit time delay, which provides the various components in loop interface 15 with time to make use of the CR bit which as already mentioned, is the first bit transmitted at every time slot.

Circuit 19 of FIG. 6 is equipped to identify each time slot of a frame and the bits in that time slot. It includes a local clock 25 which synchronizes its clock output with the incoming bit train and drives a slot counter 26 and a first bit pulse circuit 27. Counter 26 counts the slots from 0 to m-1 for each frame in response to the output clock pulses from clock 25. Circuit 27 produces a 1-output when and only when the first bit time in each time slot prevails. Components 25, 26, and 27 in essence constitute a timing assembly, which provides timing signals to various circuit elements of the loop interface 15.

Insertion control circuit 20 of FIG. 6 controls the insertion of voice and data into a then presently occurring time slot. To do so, it includes a Reserved Channel Number Register 28 which is used to record the channel number reserved by or for station 12. The number recording is accomplished by the time slot counter which identifies the slot and hence the channel to be reserved under control of a channel decision circuit 30. Channel matching circuit 29 compares the channel number stored in register 28 against the contents of slot counter 26 to inform an Output Bit Stream Generator 22 when a reserved slot passes through. The details of generator 22 are presented in FIG. 7. Channel decision circuit 30 implements channel reservation and channel release procedures in response to received reservation and release input signals, which are explained in more detail with respect to FIG. 8. Slot decision circuit 31 implements the spot seizure procedure presented in FIG. 10.

Voice samples, data, and commands to be transmitted in a reserved channel are sent from the station interface 12 to a channel output buffer 32 for subsequent use by generator 22. Similarly, data and commands to be transmitted through slot seizures are deposited first in slot output buffer 33 for station 12.

To enhance loop reliabilities, the node by-pass decision circuit 23 is provided for controlling the output selector circuit 24. When a node malfunctions or is disconnected for maintenance purposes, node by-pass decision circuit 23 generates a 1-output, which activates selector circuit 24 to "disconnect" generator 22 from the outgoing link 14 and passes the incoming bit stream to the output without modification.

Figure 7:
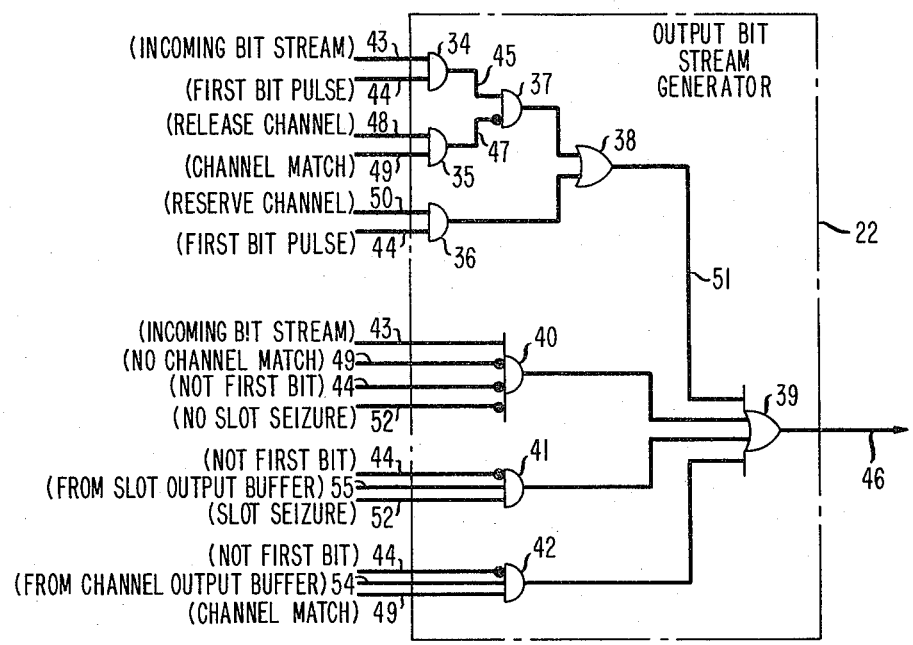
FIG. 7 is a schematic of the output bit stream generator of FIG. 6.

FIG. 7 presents an implemented scheme of output bit stream generator 22.

In FIG. 7, the output bit stream generator 22 is shown comprising a plurality of AND and OR gates 34–42 which are used for logically combining signals from the circuitry of FIG. 6 and driving the outgoing link 14 via the output selector circuit 24. Gates 34–39 are used for "0" and "1" (nonreserved and reserved) marking of the CR bit of each time slot during channel reservation and release operations and when service is not in progress for station 12. Gates 40–42 function to formulate the remaining bits of commands or data or voice samples.

AND gate 34 extracts the CR (first) bit and only the first bit of the delayed incoming bit stream. It does so by logically combining the output 43 of the bit stream retard circuit 18 of FIG. 6 and the output 44 of the first bit pulse circuit 27 of FIG. 6. The combined output 45 of gate 34 provides one input to AND gate 37. The latter functions to send the delayed CR bit unchanged to the outgoing link 14 via gates 38 and 39, conductor 46 and the output selector circuit 24, except when the time slot presently at node station 12 forms a presently reserved channel which is in the process of being released as described later.

Gate 37 is informed of the releasing conditions by a signal on its second input which is supplied from an output 47 of gate 35. The latter logically combines the release channel output 48 of the channel decision circuit 30 of FIG. 6 with the channel match output 49 from the channel match circuit 29 of FIG. 6. Output 47 is inverted in gate 37 so that the CR bit is marked "0" to signify the idle, free, or nonreserved, status of the time slot. The CR bit "0" is propagated to the outgoing link 14 through gates 38 and 39, conductor 46 and selector circuit 24.

Gate 36 functions to set the CR bit to "1" to reserve, or busy, the time slot presently rotating through node station 12. The channel decision circuit 30 specifies over conductor 50 when a channel is to be reserved and that occurrence in coincidence with the first bit pulse from circuit 27 enables gate 36 to mark the CR bit to "1" at the output 51 of gate 38 and to transmit it to the outgoing link 14 over the described path.

In summary, OR gate 38 determines the "0" or "1" mark of the CR (first) bit of the outgoing bit stream sent over the outgoing link 14. The remaining n-1 bits are produced exclusively by the AND gates 40-42.

Gate 40 simply passes through the delayed incoming n-1 bits on conductor 43 for transmission to the outgoing link 14 via gate 39, conductor 41 and selector circuit 24. This condition prevails when station 12 has requested no slot seizure and the present channel is not reserved by or for station 12.

Gate 41 propagates the bit contents of the slot output buffer 33 to the outgoing link 14 via gate 39, conductor 46 and selector circuit 24 when station 12 requests seizure of the current time slot for bursty data transmission. When station 12 seizes a time slot, the slot decision circuit 31 disables gate 40 to block the incoming bit stream on link 13 from reaching the outgoing link 14. Accordingly, the incoming bit stream is lost to stations following station 12 in the loop system. Gate 41 logically combines the output 52 of the slot decision circuit 31, the output 55 of the slot output buffer 33 and the output 44 of the first bit pulse circuit 27 for the bursty data transmission in a nonreserved time slot and, advantageously without changing the nonreserved, or free, status of the time slot.

Gate 42 propagates the bit contents of the channel output buffer 32 to the outgoing link 14 via gate 39, conductor 46 and selector circuit 24 when station 12 has reserved a channel and that channel is processing through station 12. Gate 42 logically combines the output 49 of the channel matching circuit 29, the output 54 of the channel output buffer 32, and the output 44 of the first bit pulse circuit 27.

Figure 8:
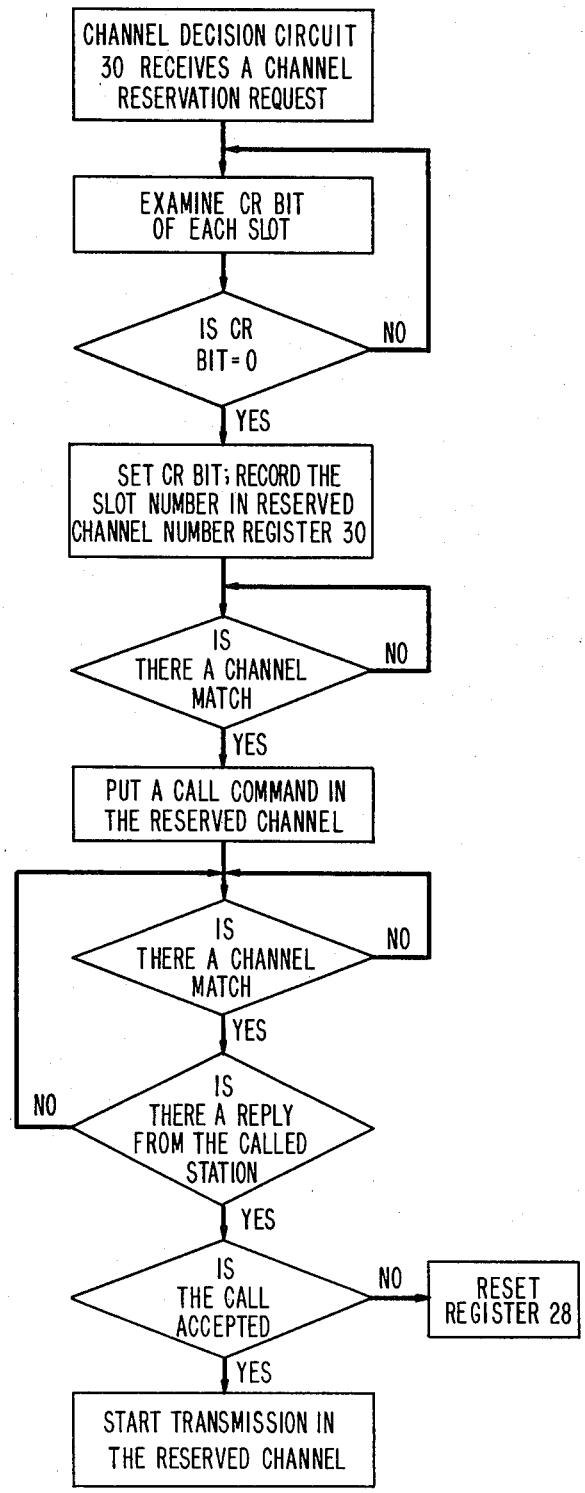
FIGS. 8 and 9 depict flow charts for the execution of channel reservation and release procedures.

Turning now to FIGS. 6, 7 and 8, a description is presented of the processing, or call set-up, steps and circuit actions involved in channel reservation operations for a node station 12 in the loop system. These operations illustratively require three successive frames of time slots to complete. Illustratively, during a first frame, the reserved-nonreserved status of each time slot is checked to find a nonreserved slot suitable for use as a communication channel. The check is made following a channel reservation request and by examining the CR bit until a nonreserved slot is found. Upon finding an unreserved slot, its CR bit is marked "1" (reserved) and the channel number is stored for operations during a repetition of the time slot during a succeeding second frame.

When that time slot arrives in the second frame, the node station 12 compares the stored time slot number with the arrived time slot number. Upon finding a match, a call processing command is inserted by station 12 into the n−1 bits of the time slot for transmission around the loop to a destination called station. Station 12 thereafter awaits a reply from the called station during the same time slot in a succeeding time frame.

Another channel match is made when the time slot again arrives in a third frame. Upon a match of the stored channel number and the arrived time slot number, checks are made for any reply by the called station and for an acceptance of the call. If the call is not accepted, the stored channel number is erased. When the call is accepted by the called station of the loop system, voice and data transmissions are conducted in the reserved time slot of the fourth and succeeding time frames forming the communication channel.

To elaborate, when station 12 requests a reservation of a channel for voice or data communication, a channel reservation request signal is supplied by the station interface 16 to the channel decision circuit 30 of FIG. 6 as illustrated in the flowchart of FIG. 8. During a first frame, circuit 30 monitors the input buffer 17 of FIG. 6 over conductor 56 for examining the CR bit stored therein to determine if it is a "0" or "1". A "1" illustratively indicates a reserved condition of the time slot (channel) presently being processed through node station 12. A "0" indicates a free, or unreserved, time slot. Upon detecting an unreserved time slot in a first frame, circuit 30 sets its reserve channel output 50 high which in coincidence with the first bit pulse from circuit 29 of FIG. 6 enables gate 36 of FIG. 7 to cause a setting to "1" of the CR bit on the outgoing link 14. It does so by generating a signal on output 50 which propagates through gates 38 and 39 and conductor 46 to the output selector circuit 24. Concurrently, as shown in FIG. 8, the time slot number is recorded in the reserved channel number register 28 of FIG. 6 under control of the channel decision circuit 30 over conductors 55 and the time slot counter 26 over conductors 57 so that the loop interface 15 knows exactly the channel it has started to reserve.

During a second frame, the channel matching circuit 29 of FIG. 6 compares the number stored in the register 28 with the time slot count in counter 26 until a match is found as shown in FIG. 8. In the meantime, a call processing command is inserted by the station interface 16 into the channel output buffer 32 of FIG. 6 for transmission over the outgoing link 14 in the reserved time slot and under control of the output bit stream generator 22 following the channel match as depicted in FIG. 8. The command is thus transmitted to the destination called station. Node station 12 thereafter awaits a reply in the reserved time slot of a next time frame.

Channel matching circuit 29 is operative in that next frame to seek in each time slot thereof a match between the number stored in register 28 with the time slot count in counter 26. When a match is found, the channel decision circuit 30 of FIG. 6 monitors the contents of the input buffer 17 to determine if a reply has been made by the called station in the reserved time slot. If not, the loop interface circuit 15 repeats the last two steps. Upon receiving a reply, the decision circuit 30 checks to ascertain if the call has been accepted. If it is not, decision circuit 30 resets the register 28 over conductor 57 for erasing the reserved time slot number therefrom. On the other hand, when the call is accepted, communication in the reserved time slot occurs in a known manner with transmission from the channel output buffer 32 of FIG. 6 through the bit stream generator 22 and the output selector circuit 24 to outgoing link 24.

Figure 9:
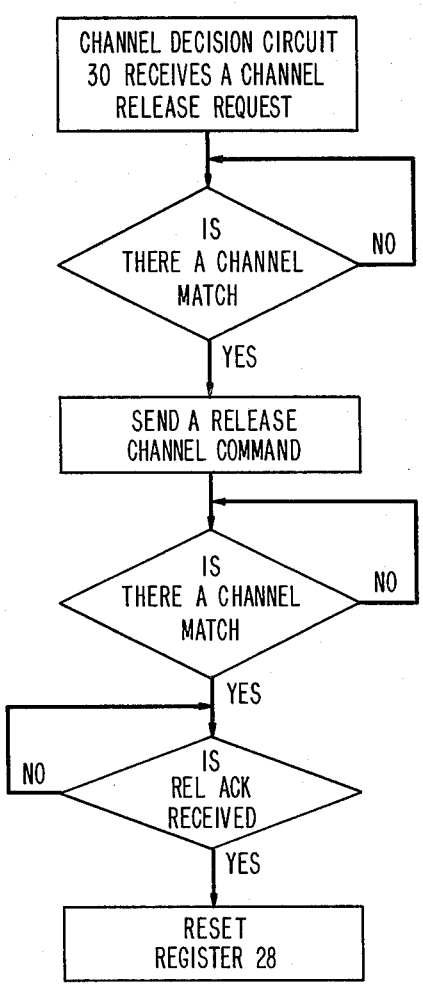

FIG. 9 discloses the flowchart of actions taken by station 12 in releasing a channel reserved by or for it. Station 12 through the station interface 16 sends a release channel request to the channel decision circuit 30 of FIG. 6. Upon receiving such a request, a release channel command is deposited in the channel output buffer 32 of FIG. 6. The channel matching circuit 29 proceeds to compare the reserved channel number in register 28 of FIG. 6 with the time slot number from counter 26 of FIG. 6. When a match is found, the release channel command is transmitted from the buffer 32 through generator 22, output selector circuit 24 and the outgoing link 14 to the destination station.

During the same time slot of a succeeding time frame, the loop interface circuit 15 checks for a channel match and then for a receipt of an acknowledgment signal from the called station. The received acknowledgment signal is deposited in the input buffer 17 of FIG. 6 and is checked by the channel decision circuit 30. Upon its receipt, decision circuit 30 resets the reserved channel number register 28 over conductor 57 to erase the reserved channel number therein and concurrently activates generator 22 to reset the CR bit to "0" and free the time slot for use by other stations.

Figure 10:
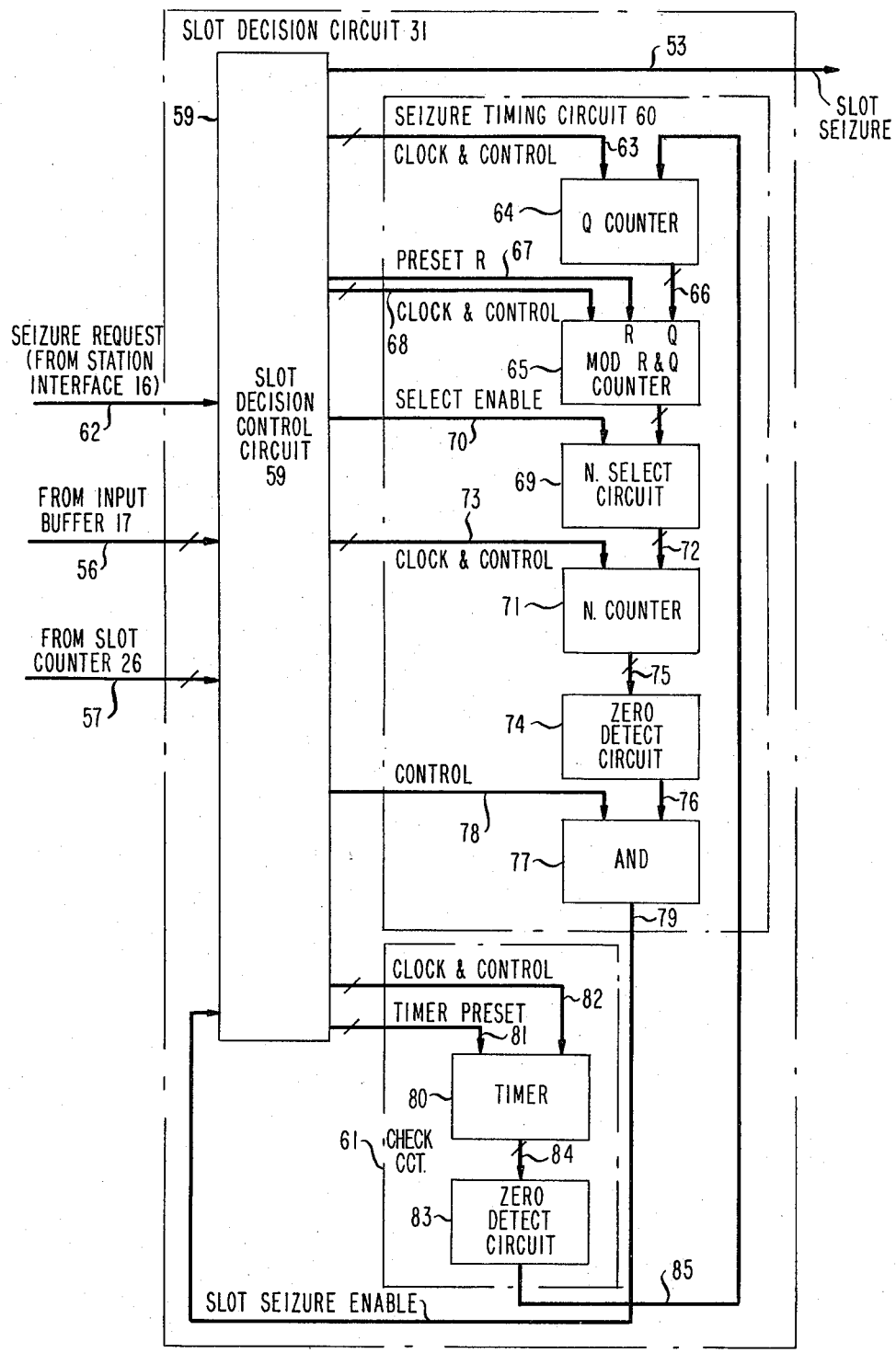
FIG. 10 is a block diagram schematic of the slot decision circuit.
Figure 11:
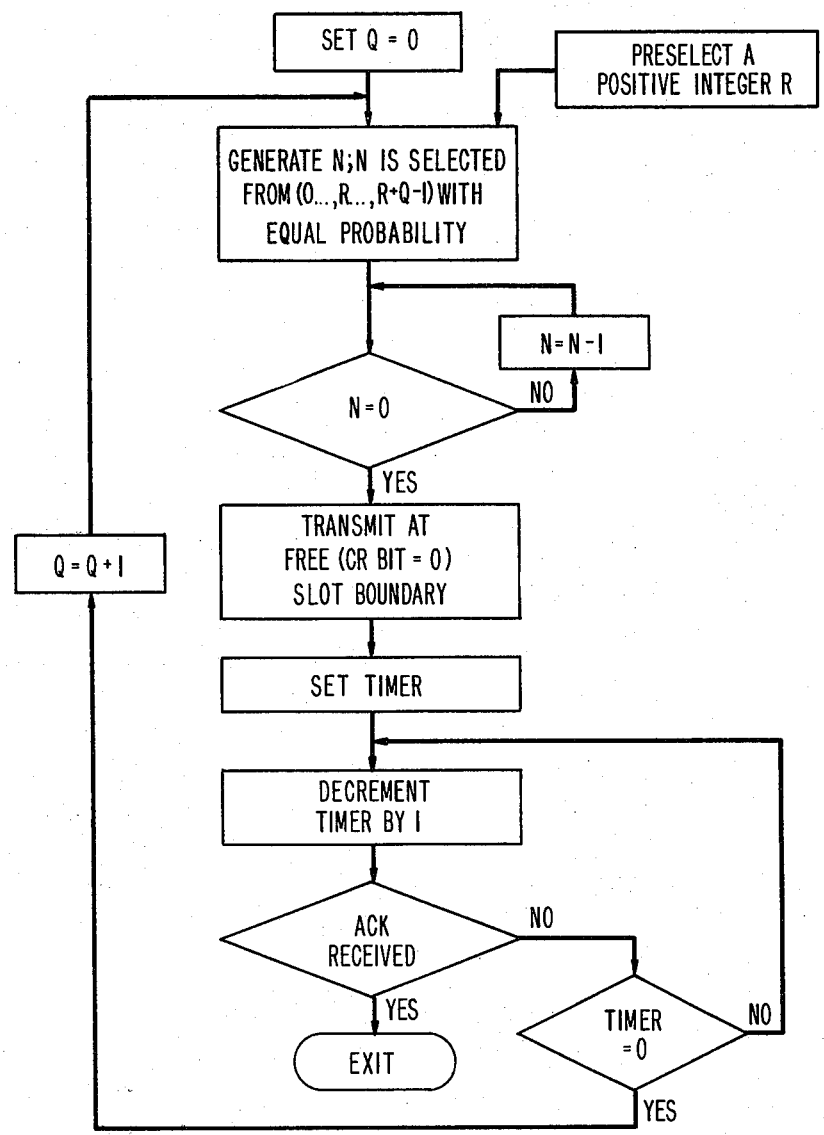
FIG. 11 is a flow chart of a slot seizure and data packet transmission procedure.

Turning now to FIGS. 10 and 11, a description is presented of the slot seizure processing steps and the operations of the slot seizure circuit 31 for station 12. As shown in FIG. 10, decision circuit 31 comprises a slot decision control circuit 59, a seizure timing circuit 60 and an acknowledgment checking circuit 61. Control circuit 59 generates clock and control signals for the timing circuit 60 and checking circuit 61. It also responds to slot seizure requests and analyzes the contents of the input buffer 17 and slot counter 26 of FIG. 6. Importantly, it generates a slot seizure signal for operating the output bit stream generator 22 of FIG. 6 to transmit a data packet.

The seizure timing circuit 60 functions to define a time interval that the station 12 must wait before it attempts to seize an available, unreserved, time slot. Effectively, it statistically controls the generation of the slot seizure signal until there is a reasonable probability that the data sought to be transmitted will actually be successfully communicated to the intended destination without being shunted by an intermediate station seizing the same slot.

Checking circuit 61 is operated by the slot decision control circuit 59 to check for a return of an acknowledgment signal within a prescribed time interval from the destination station following a data transmission thereto from station 12. The check enables circuit 61 to adjust the timing of circuit 60 to reflect a nonreceipt of an acknowledgment signal and illustratively to increase the waiting period before another slot seizure signal is generated by circuit 59 so that there is a higher probability of a successful subsequent transmission. Checking circuit 61 has no function when an acknowledgment signal is received within the prescribed interval.

Decision control circuit 59 receives a slot seizure request signal over conductor 62 and cooperates with the seizure timing circuit 60 for generating a slot seizure signal on conductor 53. Control circuit 59 supplies clock and control signals over conductors 63 to a Q counter 64 which establishes an integer Q count that represents an estimate of the number of other stations ready to seize time slots for transmitting short and bursty data items. Initially, the Q count is set to zero as depicted in FIG. 11. The Q contents of counter 64 drive a module R+Q counter 65 over conductors 66. A preset R input signal to counter 65 is supplied over conductor 67 by the decision control circuit 59. R is a positive integer which defines a range of waiting periods before a slot seizure is effected for station 12. Counter 65 illustratively counts consecutively from 0 to R+Q−1 under control of clock signals received over conductors 68 from control circuit 59.

An N select circuit 69 in response to a select enable signal from the control circuit 59 over conductor 70 initiates an N counter 71 with the then current contents of the counter 65 as received over conductors 72. Any integer from 0 to R+Q−1 can be deposited in counter 71 to define the N value or waiting interval that a ready station 12 must wait before it attempts to seize an available, unreserved, time slot. The integer N is selected to increase the total number of successful slot seizures and transmissions by all ready stations.

The actual waiting time period is defined by decrementing the N counter 71 from N to zero in response to clock pulses received from control circuit 59 over conductors 73. The zero count defines the end of the waiting period. A zero detect circuit 74 senses the zero count of counter 71 on conductors 75 and produces a "1" output on conductor 76 for partially enabling gate 77. The gate is fully enabled by control circuit 59 over conductor 78 for generating a slot seizure enable signal on conductor 79. Control circuit 59 is responsive to that enable signal for producing a slot seizure signal on conductor 53 to effect an immediate seizure of an unreserved time slot. Circuit 59 concurrently presets a timer counter 80 over conductors 81 and subsequently decrements that counter in response to clock pulses over conductors 82 for defining a time period within which an acknowledgment signal must be received from the destination station designated by the data packet transmission. When timer 80 is decremented to zero, a zero detect circuit 83 senses that condition on conductor 84 and then effects an incrementing of the Q counter 64 over conductor 85 for thereby dynamically indicating that the acknowledgment signal has not been received, that the data packet transmission has probably been lost and that another station, namely station 12, is awaiting a message retransmission.

When an acknowledgment signal is received in the input buffer 17 of FIG. 6, it is detected by the slot decision control circuit 59 over conductors 56 of FIG. 10 and circuit 59 immediately resets the counters 64, 65 and 71 as well as the timer counter 80 to zero and thereby to prepare the circuit 60 for generating a new waiting period.

What is claimed is:

1. A method for controlling a seizure of an idle one of a plurality of time slots in a time division multiplex loop communication system to transmit a packet of data information bits over a loop transmission path thereof and in that idle time slot while it retains its idle status, each of said time slots comprising at least one busy-idle status bit and information bits, each said status bit being marked busy for the duration of a call served by the respective time slot and being marked idle during intercall periods, said method comprising storing a packet of data information bits, examining said status bit of each one of said slots to identify the idle or busy status thereof, seizing an idle one of said time slots in response to said examining identifying said idle one of said time slots, and transmitting over said loop transmission path in said idle one of said time slots an idle status bit and the stored said packet of data information bits.

2. The invention of claim 1 wherein
said seizing step comprises
   generating a timing interval which a station waits before seizing said idle one of said time slots, and
   signaling the expiration of said timing interval to effect a seizure of said idle one of said time slots.

3. In a time division loop communication system having a plurality of station ports disposed along a loop transmission means with time division multiplexing including a plurality of successively recurring time frames each of which comprises a plurality of time slots, each one of said time slots transmitting at least one bit for indicating the reserved or free status of said one time slot and digitally encoded information bits, and
   each one of said ports comprising
   means responsive to a receipt of a time slot free indicating bit of said one of said time slots and to a slot request signal for controlling a seizure of said one of said time slots,
   means storing station information bits, and
   means activated by said controlling means for transmitting from said one port onto said loop transmission means said free indicating bit and said station information bits in a seized one of said time slots.

4. The invention of claim 3 wherein
said storing means comprises a slot output buffer means for storing data information bits, and
said transmitting means comprises an output bit stream generator means cooperating with said buffer means and being responsive to control signals from said controlling means for generating on said loop transmission means said free indicating bit and said data information bits in said seized one of said time slots.

5. The invention of claim 4 wherein
said controlling means comprises
   a slot seizure timing circuit for generating a time interval which said one station port waits before a generation of a slot seizure control signal, and
   a slot decision control circuit responsive to a receipt of said time slot free indicating bit of said one of said time slots, said slot seizure request signal, and a generated slot seizure control signal for signaling said output bit stream generator means to generate said free indicating bit and said data information bits in said seized one of said time slots.

6. The invention of claim 5 wherein
said slot seizure timing circuit comprises
   counter means settable to a predetermined count and being responsive to a receipt of clock signals for decrementing said predetermined count, and
   means responsive to a prescribed count of said counter means for generating said slot seizure control signal.

7. The invention of claim 6 wherein
said counter means comprises
   a counter device settable to a count estimate of the number of other of said station ports ready to seize time slots for transmission of data, said device being responsive to a receipt of clock signals for decrementing the count thereof, and
   counter apparatus responsive to a receipt of count signals from said counter device and to a range count signal for setting a count defining said time interval for said slot seizure timing circuit.

8. The invention of claim 7 wherein
said counter apparatus is responsive to clock signals for decrementing the set count defining said time interval, and
said generating means comprises a zero detect arrangement responsive to a zero count of said counter apparatus for generating said slot seizure control signal.

9. The invention of claim 8 wherein
said slot decision circuit further comprises
circuitry cooperating with said slot decision control circuit for checking for a receipt of a signal acknowledging a reception of said data information bits.

10. The invention of claim 9 wherein
said checking circuitry comprises
   a timer counter settable to a predetermined count under control of said slot decision control circuit to define a prescribed interval within which said acknowledging signal is to be received,
   means for decrementing said predetermined count of said timer counter, and
   a zero detect means responsive to a zero count of said timer counter for incrementing said count of said counter device to reflect a nonreceipt of said acknowledging signal.

11. In a time division multiplex system having a plurality of station nodes located along a unidirectional loop transmission path and a recurring frame of time slots each of which comprises at least one busy-idle status bit and information bits, each said status bit being marked busy for the duration of a call served by the respective time slot and being marked idle during intercall period,
   each of said station nodes including
   as output buffer means for storing a packet of data, and
   means responsive to a receipt of an idle status bit for one of said time slots on said loop transmission path for seizing said one of said time slots to control an insertion of the stored data packet from said buffer means into said idle time slot for transmission over said loop transmission path with said idle status bit of said one of said time slots to a destination one of said station nodes during the idle status of said one of said time slots.

12. The invention of claim 11 wherein said seizing and data insertion control means comprises
   a slot decision circuit responsive to a slot seizure request signal and a receipt of said idle status bit for selectively controlling an insertion of said stored data packet from said output buffer means to said idle time slot for transmission over said loop transmission path with said idle status bit of said one of said slots.

13. The invention of claim 12 wherein said slot decision circuit comprises a slot decision control means operable for generating a slot seizure signal, seizure timing means controlled by said decision control means for generating a slot seizure enable signal at the termination of a timing interval that defines a time which said decision control circuit waits before generating a slot seizure signal, and said decision control means being responsive to a receipt of a slot seizure request signal, said idle status bit and said slot seizure enable signal for generating said slot seizure signal.

14. The invention of claim 13 further comprising means controlled by said slot decision control means for generating a timed interval within which a signal should be received by said slot decision circuit acknowledging a receipt of said data packet at said destination one of said station nodes.

15. The invention of claim 14 further comprising means responsive to an expiration of said timed interval indicating a nonreceipt of said acknowledging signal for controlling said seizure timing means to effect an increase in the duration of said timing interval.

16. The invention of claim 12 further comprising means activated by said slot decision circuit and said output buffer for generating a bit stream in said one of said time slots, said bit stream comprising said idle status bit and said data packet stored in said output buffer means.

17. The invention of claim 16 wherein said bit stream generating means comprises configuration gate devices for logically combining said idle status bit of said one time slots sequentially with said data packet stored in said output buffer means.

18. In a time division multiplex system having a plurality of station nodes located along a unidirectional loop transmission path and a recurring frame of time slots each of which comprises at least one busy-idle status bit and information bits, each said status bit being marked busy for the duration of a call served by the respective time slot and being marked idle during intercall periods, each of said station nodes comprising input buffer means for sequentially receiving for storage time slot status and information bits from an incoming link of said loop transmission path, means for retarding by at least one bit time the received time slot status and information bits on said incoming link, means cooperating with said retarding means for identifying each time slot of said frame and said status bit thereof, output buffer means for storing voice/data information bits, another output buffer means for storing a packet of data information bits, and means responsive to a channel reservation request signal for controlling an insertion of the voice/data information bits stored in said output buffer means with a marked busy bit into an identified one of said time slots, and data insertion control means responsive to the time slot idle status bit stored in said input buffer means and to a slot seizure request signal for controlling an insertion of said packet of data information bits with said idle status bit into an idle identified one of said time slots.

19. The invention of claim 18 wherein said voice/data information bits insertion controlling means comprises channel decision circuit means responsive to said channel reservation request signal and to information bits stored in said input buffer means for controlling a reservation of said prescribed one of said time slots as a voice/data communication channel, reserved channel register means for storing the identity of the reserved one of said time slots, and channel matching means for matching the time slot identity stored in said register means with a received current time slot identity for effecting an insertion of said voice/data information bits stored in said output buffer means with said marked busy bit into said reserved one of said time slots.

20. The invention of claim 19 wherein said identifying means comprises a slot counter for identifying the presently occurring time slot at said each station node, a status bit circuit for identifying the busy-idle status bit of the presently occurring time slot at said each station node, and clock means driven by said retarding circuit for controlling the identifications by said slot counter and said status bit circuit.

21. The invention of claim 18 further comprising means activated by said data insertion control means, and identifying means and said output buffer means for generating an idle status bit of said idle identified one of said time slots and followed by a packet of information bits in said idle identified one of said time slots.

22. The invention of claim 21 wherein said data insertion control means comprises a slot decision circuit controlled by said input buffer means and said identifying means and being responsive to said slot seizure request signal for controlling an activation of said generating means.

23. The invention of claim 22 wherein said slot decision circuit comprises a slot decision control means operable for generating a slot seizure signal, seizure timing means controlled by said decision control means for generating a timing interval that defines a time which said decision control waits before generating a slot seizure signal, and said decision control means being responsive to a receipt of a slot seizure request signal, said idle status bit of said idle identified one of said time slots and to a signal specifying an expiration of said timing interval for generating said slot seizure signal.

24. The invention of claim 23 wherein said slot decision circuit further comprises means controlled by said slot decision control means for generating a timed interval within which an acknowledgment signal should be received in said idle identified one of said time slots by said slot decision circuit acknowledging a receipt of said data packet at destination one of said station nodes.

25. The invention of claim 24 further comprising means responsive to an expiration of said timed interval indicating a nonreceipt of said acknowledgment signal for controlling said seizure timing means to effect an increase of said timing interval.

26. The invention of claim 23 wherein
said slot seizure timing circuit comprises
counter means settable to a predetermined count and being responsive to a receipt of clock signals from said slot decision control means for decrementing said predetermined count, and
means responsive to a prescribed count of said counter means for generating said signal specifying an expiration of said timing interval.

27. The invention of claim 26 wherein
said counter means comprises
a counter device settable to a count estimate of the number of the said station nodes ready to seize time slots for transmission of data, said device being responsive to said receipt of said clock signal for decrementing the count thereof, and
counter apparatus responsive to a receipt of count signals from said counter device and to a range count signal for setting a count defining said timed interval for said slot seizure timing circuit.

28. The invention of claim 27 wherein
said counter apparatus is responsive to a receipt of clock signals for decrementing the set count defining said timed interval, and
said expiration signal generating means comprises a zero detect arrangement responsive to a zero count of said counter apparatus for generating a slot seizure enable signal.

29. A time division multiplexed loop communication system for providing integrated voice and data services in a plurality of time slots each of which has a reserved/free bit and comprising a plurality of station ports, each of which comprises
means for examining the reserved/free status bits of each of said time slots,
means controlled by said examining means for reserving free time slots as communication channels in said system to transmit digitally encoded data and voice samples,
means controlled by said examining means for seizing free one of said time slots, and
means activated by said seizing means for generating digitally encoded packets of data information and a free status bit in said free one of said time slots.

30. The invention of claim 29 wherein
said seizing means comprises
means activated for delaying the seizing of a free one of said time slots for a prescribed interval.

* * * * *

UNITED STATES PATENT AND TRADEMARK OFFICE
CERTIFICATE OF CORRECTION

PATENT NO. : 4,383,315
DATED : May 10, 1983
INVENTOR(S) : Hwa C. Torng

It is certified that error appears in the above—identified patent and that said Letters Patent is hereby corrected as shown below:

In the Specification, column 6, line 38, "spot" should read --slot--. Column 8, line 12, "n—1" should read --n-1--. Column 14, line 33, "and" should read --said--.

Signed and Sealed this

First Day of January 1985

[SEAL]

Attest:

GERALD J. MOSSINGHOFF

Attesting Officer          Commissioner of Patents and Trademarks